Feb. 7, 1967    B. HIKES ETAL    3,302,792
CLARIFYING APPARATUS
Filed Aug. 5, 1964    2 Sheets-Sheet 1
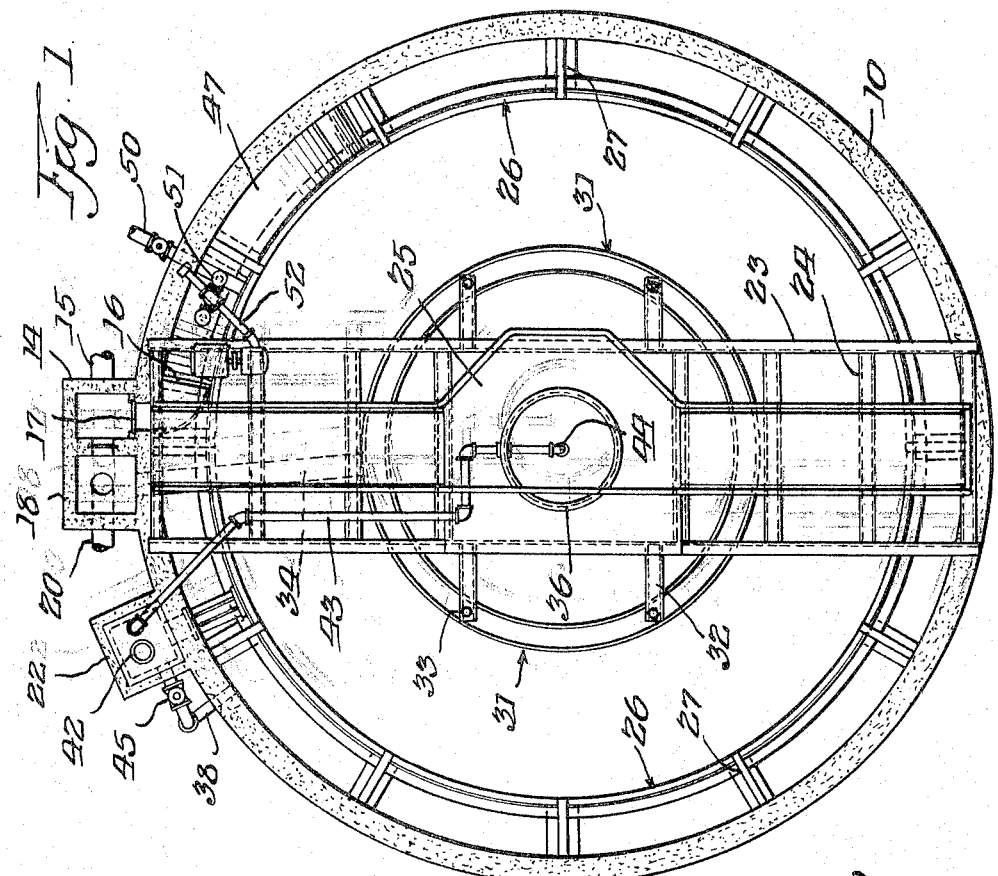
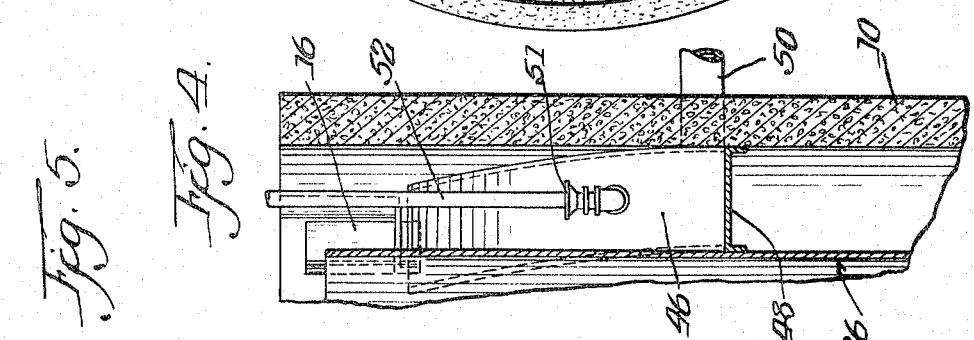
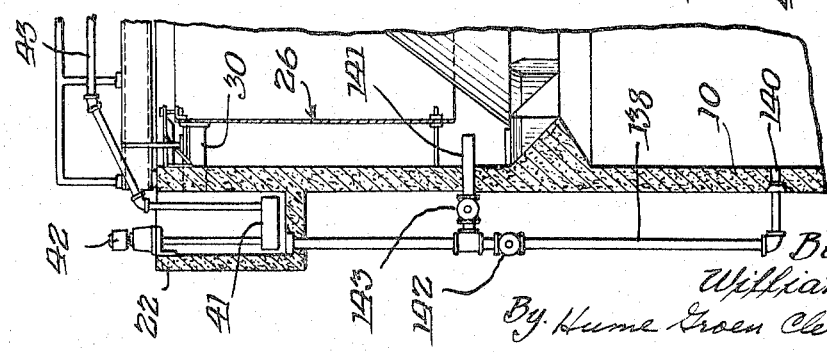
Inventors
Burd Hikes, &
William L. Berk.
By Hume Groen Clement & Hume
Attys Feb. 7, 1967  B. HIKES ETAL  3,302,792
CLARIFYING APPARATUS
Filed Aug. 5, 1964  2 Sheets-Sheet 2

Inventors.
Burd Hikes, &
William L. Berk.
By Hume Groen Clement & Hume
Attys.

3,302,792
CLARIFYING APPARATUS
Burd Hikes, Wilmette, and William L. Berk, Mount Prospect, Ill., assignors to Lakeside Engineering Corporation, Chicago, Ill., a corporation of Illinois
Filed Aug. 5, 1964, Ser. No. 387,733
3 Claims. (Cl. 210—207)

The invention relates to the disposal of sewage and industrial wastes and has reference to apparatus for treating raw sewage by clarification in a single tank, with provision being made for spiralling the flow of the incoming liquid in a circular tank and which is provided with means for collecting grit particles and similar inorganic material and for removing the same from the race.

Many of the sewers in small communities carry both storm water from the streets and sanitary wastes. These combined sewers carry an excessive amount of grit and other inorganic materials to the waste treatment plant. The grit material is deposited in the botom of the clarifying equipment or in a separate digester where it takes up digestion space and never breaks down into a liquid or a gas as the organic wastes do.

Thus an object of the invention resides in the provision of a grit removing chamber in the peripheral race of sewage clarifying equipment which will remove grit particles and similar inorganic material so that the pumps following the primary settling tank will not be exposed to the abrasive action of the grit.

In accordance with the invention the grit removing chamber is in the form of a hopper or a specially shaped chamber or vessel and the same is located in the peripheral race of the clarifying equipment so that the heavier inorganic particles will descend and be collected by the hopper, whereas the lighter organic particles will pass the hopper to be eventually settled out in the clarifying chamber or in the digestion compartment from which the inorganic particles are removed. One or more diffusers may be employed located above the apex of the hopper for gently agitating the lighter organic particles causing them to travel upwardly so that they will pass the hopper and flow into the main part of the race.

With these and various other objects in view, the invention may consist of certain novel features of construction and operation, as will be more fully described and particularly pointed out in the specification, drawings and claims appended thereto.

In the drawings which illustrate an embodiment of the device and wherein like reference characters are used to designate like parts—

FIGURE 1 is a top plan view of a combination clarifying and settling tank, the peripheral race of which is equipped with a grit collecting hopper in accordance with the invention;

FIGURE 4 is a transverse enlarged sectional view taken substantially on line 4—4 of FIGURE 3; and FIGURE 5 is a fragmentary vertical sectional view showing a modified form of clarifying tank to which the grit collecting hopper of the invention may be applied.

Figure 2:
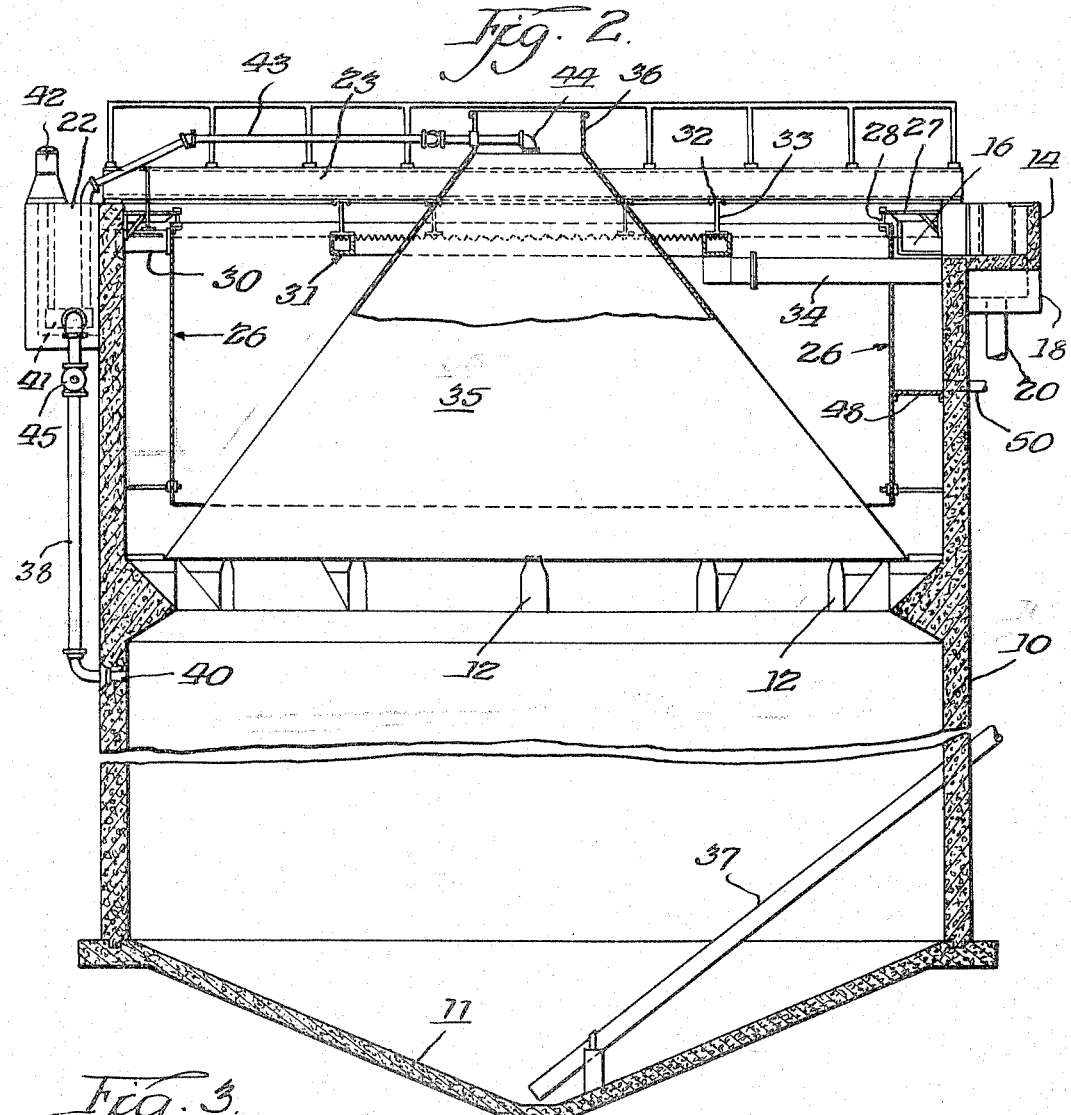
FIGURE 2 is a vertical sectional view of the tank as shown in FIGURE 1 wherein certain parts have been rotated for clarity of disclosure.

Referring to the drawings, the clarifying tank selected for illustrating the invention is preferably formed of concrete and includes a circular wall 10, a bottom wall 11 and corbels 12 located in spaced relation around the inside of the cylindrical wall for supporting a cone-shaped partition member to be presently described. The incoming liquid to be treated is generally delivered to an influent well 14, likewise preferably formed of concrete and integral with the cylindrical wall, being located exteriorly and adjacent the top of the tank. The raw liquid is delivered by the conduit 15 to the influent well 14 and from said well the raw liquid is delivered by the influent deflector 16 to within the tank. A gate or valve 17 may be provided for controlling the flow of the incoming liquid.

An effluent well 18 is also usually formed integral with the cylindrical wall of the tank and integral with the well 14. The effluent well 18 receives clear liquid from the clarifying chamber of the combination tank and said liquid is in turn delivered to the effluent discharge pipe or conduit 20 connected to the well 18 in such a way as to substantially drain the same.

A third well also comprises part of the present tank structure, the same comprising a scum well 22 and which is located exteriorly of the wall 10 adjacent the upper part of the tank. The scum well is formed of concrete and in addition to receiving the scum from the surface of the liquid in the peripheral race of the tank, the said well 22 also functions as a container for the liquid being recirculated.

The circular wall 10 of the tank supports superstructure which may include the spaced and diametrically extending beams 23 and the connecting cross beams 24. The superstructure supports a walk 25 for the convenience of the attendant. Below the superstructure a depending circular skirt 26 is supported within the tank by means of the radially extending supports 27 and the tie rods 28. The said skirt divides the interior of the tank into a peripheral race as previously referred to and into a contiguous clarifying chamber. In the illustrated embodiment the depending skirt 26 is substantially concentric with the circular wall 10 of the tank. However, the skirt could be supported eccentrically to form an annular race progressively decreasing in width from the influent deflector 16 to the scum outlet 30 located more than 180 degrees from the same. In all cases the function of the skirt 26 is to form an annular race or chamber within the tank and it will be noted that the skirt terminates some distance short of the corbels 12. The race thus extends around the depending skirt between the same and the tank wall and the contiguous clarifying chamber is located within the depending skirt. The peripheral race and the contiguous clarifying chamber are joined by a communicating passage below the skirt.

The influent deflector 16 is arranged so as to discharge the incoming liquid into the peripheral race in a clockwise direction. The floating material such as scum and grease will be removed from the race by the scum outlet 30 which discharges the same along with some liquid from the race into the scum well 22. Some of the liquid from the peripheral race will immediately pass under the skirt 26 and into the clarifying chamber. Here the solids settle out since the flow is relatively slow and travel is in an upward direction. Satisfactory clarification is effected and clear liquid is decanted by the launder 31. As best shown in FIGURE 2, the launder 31 consists of a circular trough and which is supported from the superstructure by the extensions 32, FIGURE 1, and by the tie rods 33. The top edges of the circular sides of the launder are notched to provide wiers over which the clear liquid flows to be delivered by the outlet pipe 34 to the effluent well 18.

Whereas the depending skirt 26 divides the upper section of the tank into a peripheral race and into a clarifying chamber, the cone shaped member 35 in turn partitions the clarifying chamber and provides the digestion compartment of the present combination tank. The cone member 35 rests on and is supported by the corbels 12 as clearly shown in FIGURE 2, and it will also be observed that the top open end 36 of the cone member is extended above the top of the tank and above the longitudinal beams 23. The open stack 36 thus provided serves as an expansion tank should foaming take place within the digestion compartment. The same also provides a very convenient sampling well. The location of the cone-shaped member 35 within the depending skirt 26 is such as to provide an entrance opening around the bottom of the skirt between the same and the sloping walls of the cone member. Since this opening extends completely around the cone, the length of the opening is sufficient to induce a low influent velocity as regards the liquid passing under the skirt and entering the clarifying chamber. The sludge which collects on the bottom 11 within the digestion compartment of the tank is removed by the pipe 37.

Circulation of liquid within the tank is accomplished by withdrawing liquid from the tank and returning the same to the digestion compartment by discharging the liquid into the stack opening 36. In FIGURES 1 and 2 the recirculation pipe 38 connects with the digestion compartment at 40. The opposite end of the pipe 38 enters the bottom of well 22 and connects with a pump 41 located adjacent the bottom of the well. The pump is driven by an electric motor such as 42 and the pressure side of said pump is suitably connected to the recirculation pipe 43 which has its discharge end 44 located within the stack opening 36. A hand valve 45 may be located in recirculation pipe 38 in advance of the pump 41 whereby liquid withdrawn from the digestion compartment can be shut off, in which case the pump will supply to the delivery pipe 43 only the scum and liquid delivered to the well 22 by means of the scum outlet 30. Thus the liquid from the tank may comprise a mixture, part being taken from the digestion compartment and part from the peripheral race. In all cases the liquid is recirculated by being returned to the stack opening. It is thus possible to maintain a thorough seeding of the entire digestion compartment.

The influent deflector 16 as shown is arranged so as to discharge the incoming liquid tangentially in a clockwise direction within the peripheral race. During operation, this rotation of the liquid in the race imparts rotation to the entire liquid contents within the tank. As a result the solids, except the floating material including scum and grease, will be caused to travel downwardly in a spiralling direction to the bottom of the skirt. Heavy solids will continue to descend and pass into the digestion compartment, whereas some of the lighter solids will pass underneath the depending skirt and into the clarifying chamber. Eventually these lighter solids also settle out and also pass into the digestion compartment so that within the clarifying chamber satisfactory clarification of the liquid is effected prior to the liquid flowing over the wiers of the launder, and into the effluent well 18.

Figure 3:
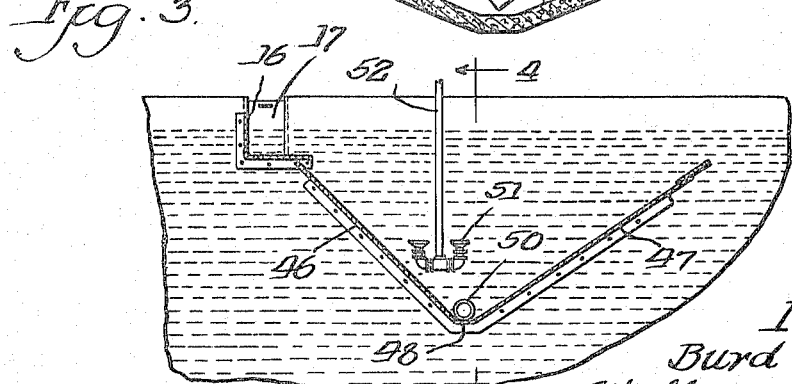
FIGURE 3 is a fragmentary vertical sectional view taken approximately on the arcuate center of the peripheral race of the tank of FIGURE 1 adjacent the tangential inlet thereof and showing features of the grit collecting hopper.

The invention provides de-gritting apparatus for removing grit particles and the like from the incoming liquid immediately upon delivery of the same into the peripheral race. Beginning with the influent deflector 16 and continuing around the peripheral race for 15 to 20 feet of the same, a hopper or specially shaped chamber or vessel is provided having sloping walls 46 and 47, FIGURE 3. Sloping wall 46 extends downwardly from the influent deflector 16 to the bottom wall 48 which forms the apex of the hopper structure. From the apex the wall 47 slopes diagonally upward and terminates below the water level in the peripheral race and below the horizontal elevation of the said influent deflector. The hopper is provided with an outlet pipe 50 which is located adjacent the bottom wall 48 and which extends through the wall 10 of the tank for removing the grit material from the hopper.

The grit material and other inorganic solids which may be entrained with the raw liquid as the same is discharged into the peripheral race will immediately descend by gravity within the race and the said grit material will be collected by the hopper provided for the purpose. The walls 46, 47 and 48 extend transversely from the depending skirt to the circular wall of the tank, and thus the grit material collected by the hopper can only be removed from the same through the outlet pipe 50. In the event some of the organic waste materials are collected by the hopper, these can be agitated by providing one or more air diffusers such as 51 and which may be supplied with air under presure by the supply pipe 52. By agitating the light organic solids they are caused to travel upwardly and thus the same will eventually pass the hopper and flow into the remaining section of the peripheral race for settling out in a manner as previously described.

FIGURE 5 illustrates a modified form of clarifying tank having a peripheral race and which may be equipped with the grit removing hopper of the invention. In this modification the recirculating pipe 138 is provided with a branch connection 141 which extends through the wall of the tank and taps the liquid at the base of the peripheral race. In order that the operator may control the liquid to be recirculated, the pipe 138 is provided with a valve 142 and branch pipe 141 is likewise provided with a valve 143. When valve 142 is closed all of the recirculated liquid is withdrawn from below the peripheral race except the liquid and scum which may be delivered to well 22 from the scum outlet 30. When valve 143 is closed and valve 142 is opened all the recirculated liquid is withdrawn from the digestion compartment with the exception of that supplied to the well by the scum outlet.

The invention is not to be limited to or by details of construction of the particular embodiment thereof illustrated by the drawings, as various other forms of the device, will, of course, be apparent to those skilled in the art without departing from the spirit of the invention or the scope of the claims.

What is claimed is:

1. In a settling device, in combination, a circular tank having a vertical cylindrical wall and a bottom wall, a circular skirt depending within the tank in spaced relation with the cylindrical wall, said skirt terminating short of the bottom wall and dividing the tank into an annular chamber around the skirt and into a centrally disposed clarifying chamber within the skirt, an inlet conduit for supplying incoming liquid to the annular chamber, a launder positioned within the clarifying chamber for decanting the clear liquid, a partition wall in the annular chamber sloping downward from the inlet conduit to approximately midway of the depth of the annular chamber, a second partition wall in the annular chamber sloping upward from the first partition wall to terminate a short distance below the level of the liquid in the annular chamber, said first and second partition walls forming a hopper shaped receptacle for collecting grit particles from the liquid delivered to the annular chamber by the inlet conduit.

2. In a settling device of the character as defined by claim 1, additionally including an outlet conduit for the grit particles and which is located at the junction of the first and second partition walls.

3. In a settling device of the character as defined by claim 1, additionally including an outlet conduit for the grit particles and which is located at the junction of the first and second partition walls, and air diffusing means within the annular chamber relatively adjacent the outlet conduit for the grit particles.

(References on following page)

References Cited by the Examiner

UNITED STATES PATENTS

| | | | |
|---|---|---|---|
| 2,418,950 | 4/1947 | Montgomery | 210—528 X |
| 2,436,375 | 2/1948 | Booth et al. | 210—521 X |
| 2,717,873 | 9/1955 | Montgomery et al. | 210—197 |

FOREIGN PATENTS 1,095,895  12/1954  France.

References Cited by the Applicant

UNITED STATES PATENTS

| | | |
|---|---|---|
| 978,889 | 12/1910 | Imhoff. |
| 1,692,446 | 11/1928 | Imhoff. |
| 1,987,888 | 1/1935 | Babbitt. |
| 2,714,090 | 7/1955 | Thompson. |

REUBEN FRIEDMAN, *Primary Examiner.*

J. DE CESARE, *Assistant Examiner.*